United States Patent [19]
Young et al.

[11] 3,733,854
[45] May 22, 1973

[54] SHIELDED ANGULAR DRIVE TRANSMITTING JOINT AND SHIELDED QUICKLY DETACHABLE COUPLING THEREOF

[75] Inventors: John R. Young; John C. McElwain, both of Rochester, Mich.

[73] Assignee: North American Rockwell Corporation, Pittsburgh, Pa.

[22] Filed: Dec. 23, 1971

[21] Appl. No.: 211,202

[52] U.S. Cl. ............................ 64/32, 64/6, 287/119
[51] Int. Cl. ................................... F16d 18/32
[58] Field of Search ...................... 64/32, 4, 6; 287/119

[56] References Cited

UNITED STATES PATENTS

| 2,948,559 | 8/1960 | Recker | 64/4 |
| 3,344,618 | 10/1967 | Young | 64/4 |
| 3,357,206 | 12/1967 | Christie | 64/6 |
| 3,503,225 | 3/1970 | Shindelar et al. | 64/4 |
| 3,551,013 | 12/1970 | Trojanowski et al. | 64/6 |

Primary Examiner—Charles J. Myhre
Assistant Examiner—Randall Heald
Attorney—John R. Bronaugh et al.

[57] ABSTRACT

A shielded angular drive assembly such as a drive transmitting joint adapted for connection to the power takeoff shaft of an agricultural vehicle is provided with a shielded externally actuatable quick detachable coupling by which the drive transmitting shaft can be easily connected to and disconnected from the power take-off shaft of a vehicle and to the power in-put shaft of the driven auxiliary unit and in which the mechanism of the coupling is completely enclosed to prevent injury to personnel resulting from inadvertent contact with the coupling while the shaft is rotating and to prevent entanglement of stray objects in the rotating components of the coupling.

10 Claims, 5 Drawing Figures

Patented May 22, 1973

3,733,854

3,733,854

SHIELDED ANGULAR DRIVE TRANSMITTING JOINT AND SHIELDED QUICKLY DETACHABLE COUPLING THEREOF

BACKGROUND OF THE INVENTION

The present invention relates in general to shielded angular drive assemblies, one form of which is illustrated in U.S. Pat. No. 3,418,828, issued Dec. 31, 1968 to S. Leroy Carns for "Shielded Angular Drive Assembly." Such assemblies are frequently provided with quickly detachable couplings at each end. One form of prior art coupling of that type is that illustrated in U.S. Pat. No. 3,480,310, issued Nov. 25, 1969 to J. C. McElwain for "Quick Detachable Coupling."

SUMMARY OF INVENTION

The present invention provides an improved shielded angular drive assembly and in particular an improved quick detachable coupling for such an assembly in which the mechanism of the quick detachable coupling is completely enclosed within a shield which is normally rotatable relative to and independently of the internal components of the coupling and which cannot be positively driven by the internal coupling components whereby, not only the shafting and the universal joints of such an assembly are shielded as in the aforesaid patent to Carns, but also the components of the quick detachable coupling itself are fully shielded. A further feature of this invention is that the shield or the quick detachable coupling is manipulated while the coupling is at rest to effect release of the quick detachable coupling from the shaft to which it is connected when desired.

DETAILED DESCRIPTION

Figure 1:
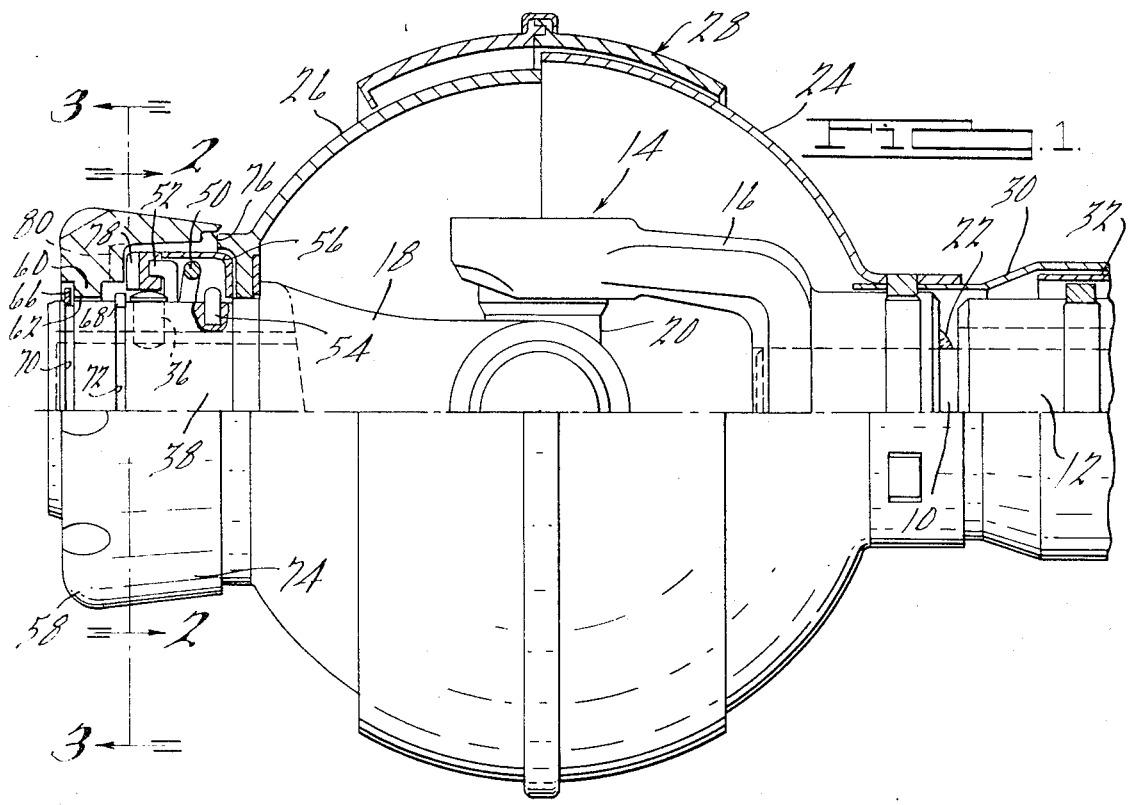
FIG. 1 is an elevational view, the upper half of which is shown in cross section, of one end of a shaft assembly showing in detail the universal joint, the quick detachable coupling, the connection of the universal joint to the shafting of the assembly and the shielding for the coupling joint and shaft.

Referring now in detail to the drawings and particularly to FIG. 1, the power transmitting shaft assembly of the present invention comprises a pair of axially slidably interfitting relative non-rotatably connected shafts 10 and 12 to the oppositely projecting ends of which are connected universal joint assemblies such as universal joint assembly 14.

Universal joint assembly 14 comprises a pair of yokes 16 and 18 interconnected by a cross 20 journaled relative to the yokes 16 and 18 by antifriction bearings (not shown). Yoke 16 is fixed to the end of shaft 10 by welding as indicated at 22.

The universal joint assembly 14 is shielded by a shield assembly comprising a pair of bells 24 and 26 frictionally retained upon the yokes 16 and 18 respectively and an annular bridging shield member 28 frictionally retained relative to the members 24 and 26. The shafting, formed by the shafts 10 and 12, is shielded by a pair of interfitting tubular shields 30 and 32 axially fixed relative to and lightly rotatably frictionally retained relative to the shafts 10 and 12 respectively.

The shielded quickly detachable coupling 34 is illustrated at the left in FIG. 1.

Figures 2, 3:
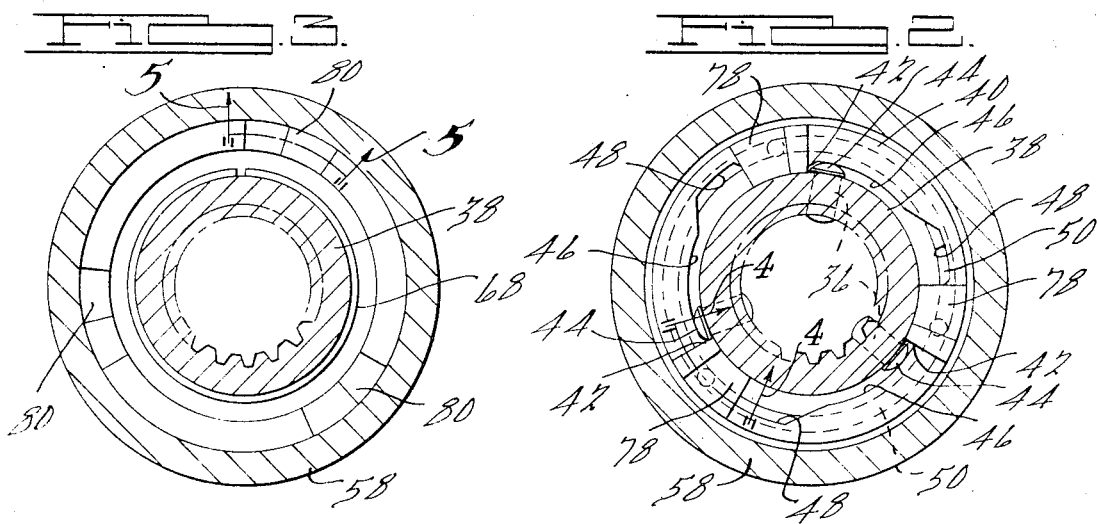
FIG. 2 is a sectional view on the line 2—2 of FIG. 1.
FIG. 3 is a sectional view substantially on the line 3—3 of FIG. 1.

As in the aforesaid McElwain patent, the locking mechanism of the quick detachable coupling 34 comprises a plurality of equiangularly spaced locking pins 36 mounted for radial movement in radially extending openings through the hub 38 of the yoke 18, a surrounding locking cam 40 which is mounted for limited angular motion about the axis of the hub 38 between a locking position as illustrated in FIG. 2 and an unlocking position. The locking position of cam 40 is established by the abutment of the radial shoulders 42 from the cam 40 against the enlarged heads 44 of the locking pins 36. In this position, the locking pins 36 are prevented from moving radially outwardly relative to the hub 38 by the confining annular surfaces 46 on the cam 40.

The cam 40 is rotatable in a counterclockwise direction as viewed in FIG. 2 until the circumferential surfaces 48 of the cam 40 are aligned with the heads 44 of the locking pins 36. Since the surfaces 48 of the cam 40 are spaced radially from the axis of the hub 38 a greater distance than the surfaces 46, when the cam 40 is so rotated, the pins 36 are free to move radially outwardly relative to the hub 38 to positions in which they no longer project within the bore of the hub 38.

The cam 40 is biased annularly to its locking position as illustrated in FIG. 2 by a torsion spring 60 engaged with the cam 40 at 52 and with the hub 38 at 54 as illustrated in FIG. 1. The spring 50 is enclosed within an annular spring retainer housing 56 as shown in FIG. 1.

The mechanism of the quick detachable coupling as thus far described is enclosed within a shield cover 58. Cover 58 is of generally annular configuration having a radially extending flange 60 along with a through aperture 62 through which the hub 38 of the yoke 18 extends. The limits of axial movement of the flange 60 relative to the hub 38 of the yoke 18 are defined by a pair of snap rings 64 and 68 retained in annular grooves 70 and 72 in the hub 38.

The cover 58 has an external axially extending portion 74 which extends toward the bell 26 over the cam 40, the spring 50 and the spring retainer 56 to enclose these components 40, 50 and 56 and prevent contact with them by persons or objects adjacent the assembly. The right-hand end of the annular portion 74 of the shield cover 58 has an internal annular groove 76 dimensioned to receive the annular hub of the bell 26 when the cover shield 58 is shifted axially to the right from its position as illustrated in FIG. 1.

Figures 4, 5:
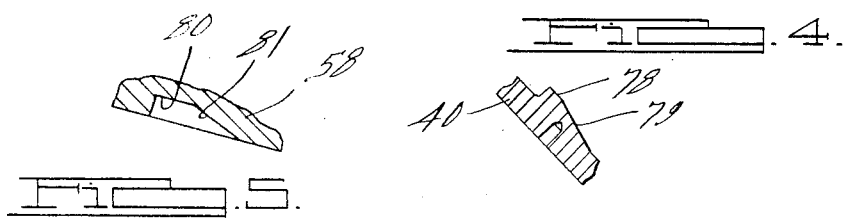
FIG. 4 is a fragmentary sectional view along the line 4—4 of FIG. 2.
FIG. 5 is a fragmentary sectional view substantially on the line 5—5 of FIG. 3.

The cover shield 58 is formed externally with finger grip recesses as shown so that it may be manually moved to the right as viewed In FIG. 1 into one-way clutching engagement with the cam 40 as will now be explained. The face of cam 40 adjacent the flange 60 of the cover shield 58 is formed with a plurality of equiangularly spaced clutch teeth 78 of the configuration illustrated in FIGS. 1, 2 and 4. When the cover shield 58 is moved to the right in FIG. 1, these clutch teeth 78 are engaged with clutch notches 80 also equiangularly spaced and like in number and of the configuration illustrated in FIGS. 1, 3 and 5. As is apparent from the configuration of the clutch teeth 78 and the complementary notches 80, when the cover shield 58 is moved to the right as viewed in FIG. 1, if the cam 40 is at rest, the teeth 78 can be engaged with the notches 80 and, by rotation of the cover shield 58, the cam 40 can be rotated in a counterclockwise direction as viewed in FIG. 2 to release the lock pins 36 as previously described. If the shaft is rotating in its normal direction (also counterclockwise as viewed in FIG. 2), and thus imparting rotation to the cam 40, it is possible to engage the notches 80 with the teeth 78 since their inclined surfaces are so oriented relative to the direction of rotation of the yoke 18 that the inclined surfaces 79 of the rotating teeth 78 will engage the inclined surfaces 81 of the notches 80 and axially cam the cover shield 58 to the left as viewed in FIG. 1 thereby preventing engagement between the shield cover 58 and the cam 40.

In summary therefore, the entire assembly including the shafts 10 and 12, the universal joints 14 at each end of the assembly and the operating mechanism of the quick detachable coupling are completely enclosed within annular shields rotatable relative thereto formed by the cover shield 58, bell 26, annular member 28, bell 24 and interfitting sleeves 30 and 32. Any personnel contacting this shaft assembly while it is rotating is completely isolated from the rotating components of the shaft assembly. Likewise the rotating components of the shaft assembly will not become entangled with any objects which may come near them.

What is claimed is:

1. A fully shielded drive transmitting joint of the type wherein two end members are interconnected for relative angular movement, wherein opposed interfitting shield members rotatably mounted on said end members cooperate with each other and with a further bridging shield member to provide and maintain enclosure of the joint, a quick detachable coupling mechanism on one of said end members having a locking position and a release position whereby said one of said end members can be selectively drive connected and locked to the end of a shaft, the improvement comprising an annular shield enclosing said quickly detachable coupling mechanism and mounted on said one of said end members for limited axial movement and for rotation relative thereto, and means operable upon axial movement of said mechanism shield to one of its limits of axial movement and simultaneous limited rotary movement of said mechanism shield while at such limit of its axial movement to actuate said mechanism to its release position whereby said one of said end members can be drive connected to or disconnected from such a shaft.

2. The combination defined in claim 1 wherein said mechanism actuating means comprises a clutch mechanism.

3. The combination defined in claim 2 wherein said clutch mechanism is a unidirectional clutch mechanism arranged to transmit movement from said shield only in the normal direction of rotation of said one end member whereby positive drive rotation of said shield in response to rotation of said one end member is precluded.

4. The combination defined in claim 3 wherein said clutch mechanism comprises at least one pair of engageable ratchet teeth.

5. The combination defined in claim 2 wherein said one of said one end members has a hub with an internally splined bore; wherein said locking mechanism comprises a plurality of locking pins mounted on said hub for movement from and to locking positions in which said pins project into said bore and a locking cam mounted on said hub in cooperative relation with said pins and movable between opposed limit positions in one of which positions said pins are locked in their locking positions and in the other of which positions said pins are released for movement from their locking positions to permit insertion into and removal from said bore of a complementarily externally splined shaft, and means normally biasing said cam toward its limit position wherein said pins are locked in their locking positions.

6. The combination defined in claim 5 wherein said locking pins are mounted for movement radially of said bore.

7. The joint defined in claim 1 wherein said two end members are opposed yokes and are interconnected by a cross and bearing assembly thus forming a universal joint.

8. A shielded quick detachable torque transmitting coupling assembly manipulatable for connecting and disconnecting an inner member in non-rotatable relation with a surrounding outer member while precluding inadvertent contact with said members, cooperating axially slidably interfitting means on said members for non-rotatably connecting said members, an external recess on said inner member, locking means movably mounted on said outer member with a portion thereof adapted to extend into said recess, axially fixed cam means rotatably mounted on said outer member for limited movement between a locking position where said cam means engages said locking means and positively projects said portion of said locking means into said recess and a nonlocking position wherein said cam means permits displacement of said locking means outwardly of said recess, resilient means normally biasing said cam means into locking position, a coupling mechanism shielding casing mounted on said outer member surrounding and enclosing said cam means and said resilient means to prevent inadvartent contact therewith, said shielding casing being rotatable relative to and mounted for limited axial movement relative to said cam means, and coacting axially engageable unidirectional clutch means on said cam means and said casing, said casing being axially shiftable to engage said clutch means and thereby prevent rotation of said cam member by manipulation of said casing to release said locking means and permit axial engagement or disengagement of said inner and outer members.

9. The coupling defined in claim 8 wherein said slidably interfitting means are complementary splines on said inner and outer members.

10. The coupling defined in claim 8 wherein torque is normally transmitted between said inner and outer members only in one direction of rotation thereof and wherein said unidirectional clutch means is oriented to permit rotation of said cam means by said shielding casing only in the same direction as said one direction so that during normal rotation of said inner and outer members, said clutch means cannot be engaged to drive the casing shield from said cam means on said outer member.

* * * * *